…

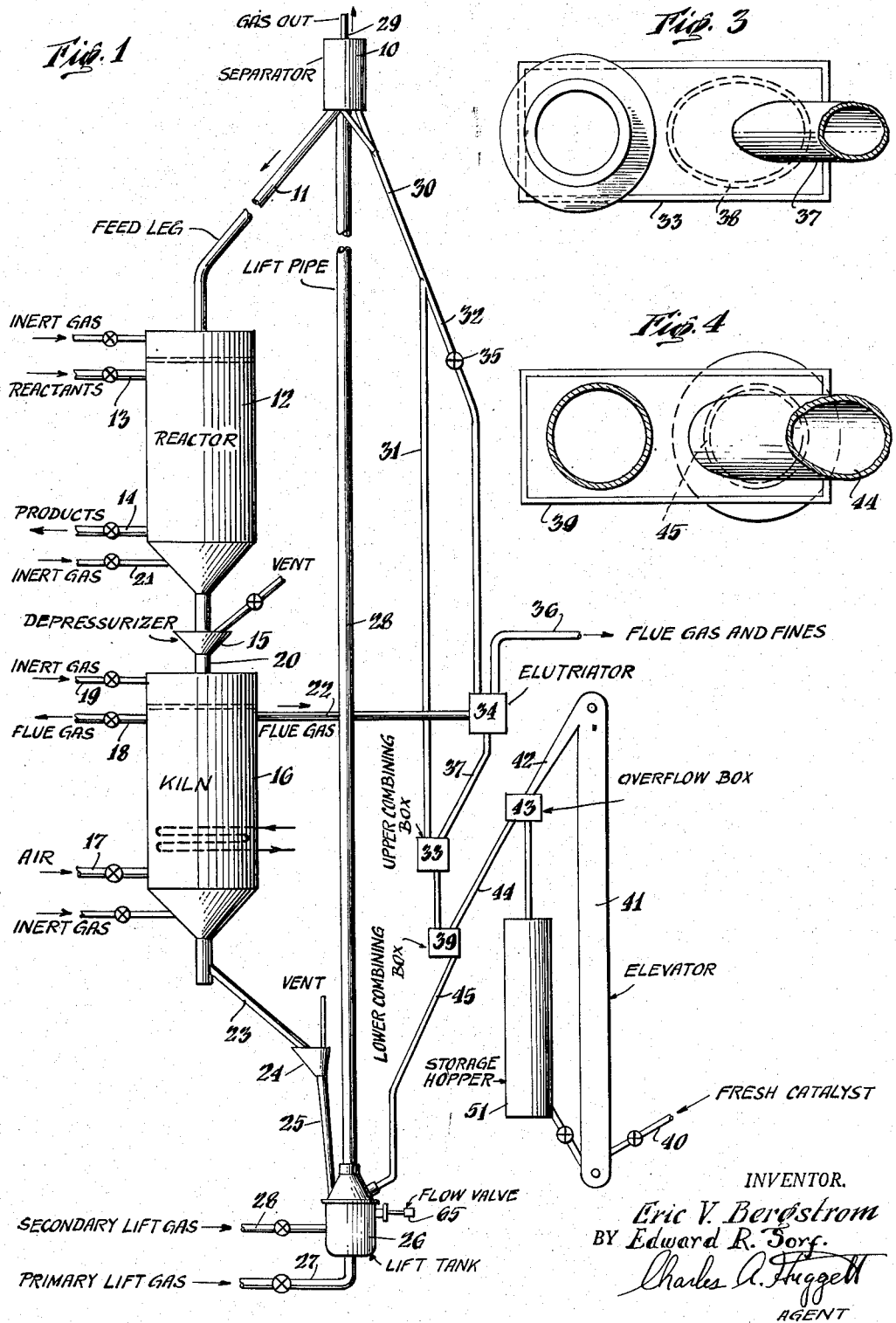

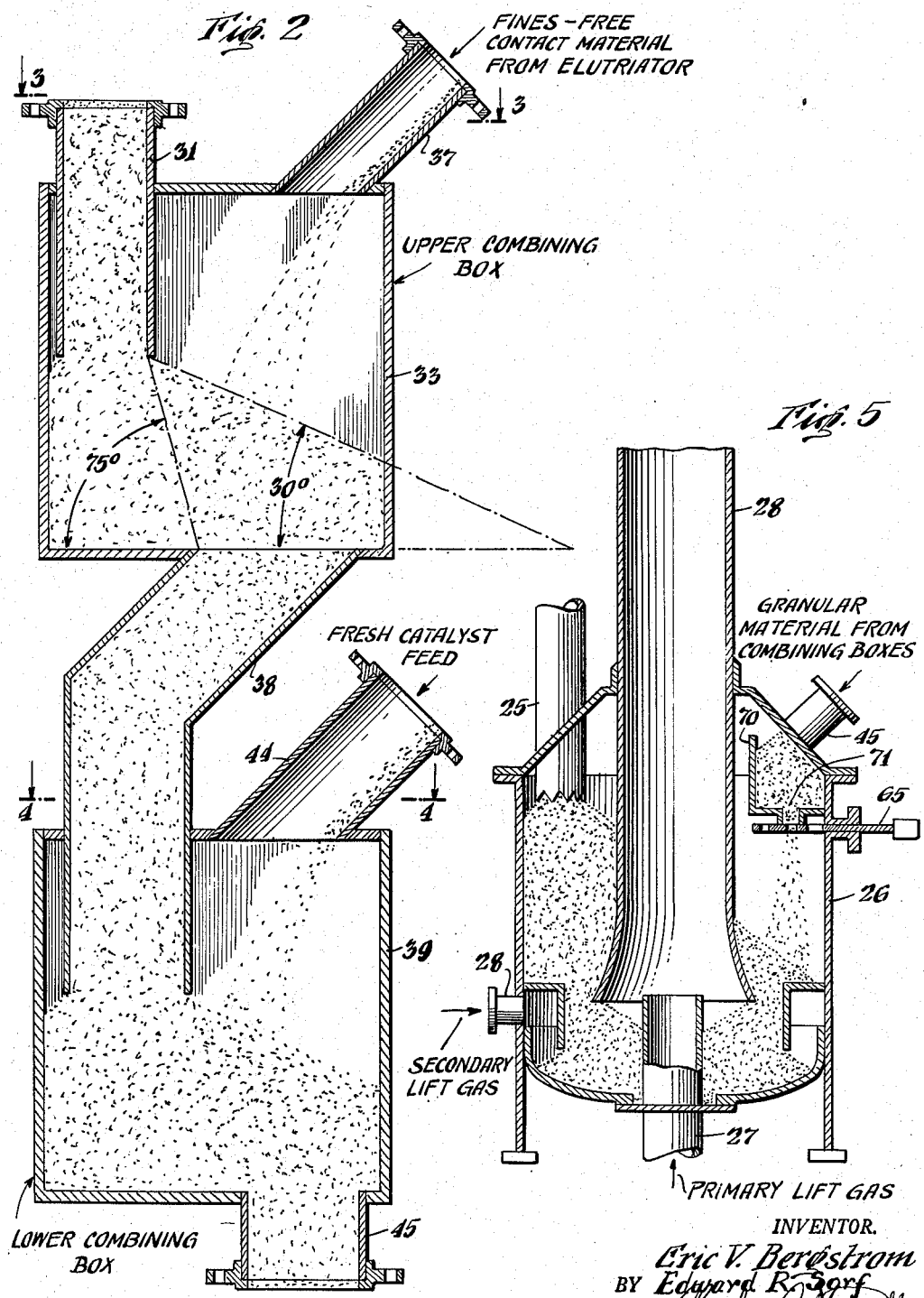

UNITED STATES PATENT OFFICE 2,656,306

METHOD AND APPARATUS FOR CONDUCTING MOVING CONTACT MATERIAL HYDROCARBON CONVERSION PROCESSES

Eric V. Bergstrom, Short Hills, and Edward R. Sorf, Fanwood, N. J., assignors to Socony-Vacuum Oil Company, Incorporated, a corporation of New York Application May 25, 1951, Serial No. 228,293

15 Claims. (Cl. 196—52)

This invention pertains to processes for the conversion of fluid hydrocarbons in the presence of a granular contact material which may or may not be catalytic in nature. Typical processes to which this invention pertains are the catalytic cracking conversion, isomerization, hydrogenation, reforming, dehydrogenation, aromatization, hydroforming, treating and desulfurization of petroleum fractions. Also typical are the coking, viscosity reducing of petroleum residuums and high temperature pyrolytic conversion processes such as the conversion of propane and ethane to ethylene or of methane to acetylene. In these latter processes the granular contact material serves merely as a heat carrying material.

An important commercial unit for continuously conducting reactions of this type is one wherein the granular contact material is passed cyclically through hydrocarbon conversion and contact material reconditioning zones in which it flows downwardly as a substantially compact column. The contact material employed in such a process may be a catalyst in the form of natural and treated clays, bauxites, inert carriers impregnated with certain catalyst active metallic oxides or synthetic associations of silica, alumina, magnesia or of combinations thereof to which may be added small additional amounts of metallic oxides for specific purposes. When the contact material is employed for heat carrying purposes only it may take the form of metal balls, capsules containing fusible alloys, pebbles, carborundum, mullite, zirconium oxide, fused alumina and the like. For coking processes the solid material may consist of a low activity clay catalyst, petroleum coke or porous inert material such as pumice. The contact material may be in the form of pellets, spheres, tablets or irregular shaped particles and it should be understood that the term "granular" is employed broadly herein as covering any of the above. The contact material particles may range in size from about 3–100 mesh Tyler Screen Analysis, and preferably should be of the order of 4–15 mesh Tyler.

For purposes of illustration, the invention will be described with reference to a specific process, a catalytic cracking process. In the moving bed system of catalytic cracking, the particles in granular form are contacted with suitably prepared hydrocarbons while gravitating downwardly through a reaction zone in the form of a substantially compact column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is deposited on the surface of the catalyst, impairing its ability to function catalytically. The coked or spent catalyst is removed from the bottom of the reaction zone continuously and transferred to the top of a gravitating compact column of particles in a regeneration zone. The catalyst gravitating through the regeneration zone is contacted with a combustion supporting gas, such as air, to burn off the coke deposits from the surface of the catalyst. The coke-free or regenerated catalyst is withdrawn continuously from the bottom of the column in the regeneration zone and transferred to the top of the reaction zone, completing the continuous path. This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. The catalyst is lifted, therefore, at temperatures of approximately 800–1200° F., or thereabouts.

As the catalyst material gravitates through the contacting zones, the gas or vapors contact the catalyst surface by passing through the voids between the particles. It is desirable to maintain the flow of gas through the bed uniform for a variety of reasons. For example, channelling of gas through the reactor may result in non-uniform coke deposition on the catalyst and non-uniform conversion of the hydrocarbon charge. The cracking efficiency is materially reduced from that which is obtained when the gas flows uniformly through the bed. Channelling in the regenerator causes the particles passing through the channel to overheat and thereby damage the catalytic activity of these particles. Those particles not receiving their share of combustion supporting gas are not sufficiently regenerated to regain their former cracking activity.

Channelling is caused in these moving bed systems by the classification or accumulation of fine particles. Fine particles or fines are continuously produced in these systems by attrition. Attrition involves the breaking or spalling of the catalyst particles when they impinge upon each other or the metal walls of the enclosed system. Attrition is also caused by the particles sliding against each other or against the metal walls. The fines tend to classify or gather together, especially when the catalyst is passed through sloping chutes. In addition to causing the gas to channel through the beds, the fines cause an increased pressure drop across the beds. For these and other reasons, it is necessary to remove fines from the system and replenish the inventory with fresh catalyst.

Recently, moving bed conversion systems have been developed which incorporate gas lifts to raise the contact material from the bottom of one gravitating column to the top of the other column. When a side by side arrangement of regenerator and reactor is used, two gas lifts are required. When a superimposed arrangement is utilized, such as reactor over regenerator or vice versa, only one gas lift need be used. A preferred form of lift comprises essentially a substantially vertical lift pipe, a lift tank located at the bottom of the pipe and a separator located at the top of the pipe, the ends of the pipe being projected to an intermediate location in each vessel. The catalyst is introduced into the feed tank to form a substantially compact mass about the bottom of the lift pipe. The major portion of the lift gas is introduced through a primary gas conduit located a short distance below the pipe and directed up the pipe. A relatively smaller amount of secondary gas is introduced into the lift tank to enter the bed of catalyst a spaced distance away from the lower end of the lift pipe. The primary gas passes up the pipe without passing through any substantial thickness of catalyst bed whereas the secondary gas passes through at least a portion of the bed to push catalyst into the primary gas stream. The particles, both granular and fines, are suspended by the gas and lifted up the pipe to the separator. The particles settle from the gas in the separator onto a bed of the solid material about the top of the lift pipe, and the gas is withdrawn separately from the vessel.

The lift tank is generally operated at a pressure above atmospheric and the separator at or even below atmospheric. At least there must be a pressure drop across the lift pipe to effect transfer of the contact material therethrough. A suitable lift tank is disclosed in more detail in copending application for Letters Patent Serial Number 211,258, filed February 16, 1951. A suitable lift pipe is disclosed and claimed in copending application Serial Number 210,942, filed February 14, 1951, and a suitable separator is disclosed and claimed in copending application Serial Number 211,238, filed February 16, 1951.

It has been proposed that a side stream of contact material be withdrawn from the bottom of the separator and gravitated through an elutriator. In this scheme the fines would be removed in the gas passed through the elutriator and the fines-free, granular contact material gravitated into the top of the lift tank. Because the lift tank is operated at a higher pressure than the elutriator, a substantially compact column of granular material of sufficient length must be maintained between the elutriator and the tank to provide a seal between the vessels and effect smooth feeding of the contact material into the tank. For example, the minimum required length of this leg may be conveniently calculated by dividing the weight of catalyst in the leg by the average cross-sectional area, in pounds per square inch, which is greater than the pressure differential between the top and bottom of the leg by a safe margin. If this leg is not maintained, the upward flow of gas through the leg will have sufficient velocity to disrupt the column and interrupt or prevent the catalyst from feeding into the high pressure vessel. For example, if it is desired to operate the lift tank at 5 p. s. i. (gauge), the height of the compact leg must be, for a catalyst having a poured density of 45 pounds per cubic foot, at least:

$$\frac{45 \times 1 \times \text{height (ft.)}}{144} = 5 \text{ p. s. i.}$$

or $$\text{height} = 16 \text{ ft.}$$

For satisfactory operation, it is found desirable to provide a substantially compact column which is 15–50 per cent longer than the calculated length. For example, for the assumed pressure of p. s. i. in the lift tank, a leg of about 18–24 ft. long would be satisfactory. It is assumed hereinabove, however, that the leg of compacted catalyst is substantially vertical. Where the leg is not vertical, longer legs must be used to provide satisfactory results. The above applies to gravity feed legs which are tapered so as to overcome the effect of the gas expansion as it passes upwardly through the leg. For legs of uniform cross-section along their lengths, somewhat greater lengths than those indicated should be employed.

The elutriator is operated by releasing catalyst into the top of the vessel in the form of a shower and gas into the bottom of the vessel to pass upwardly through the falling catalyst. The upward velocity of the gas is controlled to effect lifting and entrainment of the fines. The gas and fines are withdrawn from the top of the vessel and the fines-free material is withdrawn from the bottom. It is necessary that the seal column between the lift tank and the elutriator be prevented from rising into the elutriator. Hence, the level of the seal column has to be maintained fixed at a level beneath the elutriator.

It is an object of this invention to provide apparatus and method for continuously introducing contact material into a high pressure region at a substantially constant rate from two low pressure regions, and preferentially supplying the contact material from one of the low pressure regions to the high pressure region rather than from the other low pressure region.

It is a further object of this invention to provide method and apparatus for combining two streams of contact material to form a column of contact material of substantially constant height adapted to feed continuously into a high pressure region at a substantially constant rate of flow and effecting a preferential flow of the contact material from one of the streams to the high pressure region.

These and other objects of the invention will be made more apparent in the following description of the method and apparatus referred to in the attached drawings. The sketches are all highly diagrammatic in form, included only to illustrate the form and nature of the invention.

Figure 1 is a vertical elevation of a moving bed cracking system incorporating the instant invention.

Figure 2 is a vertical elevation in section showing the details of the combining boxes of Figure 1.

Figure 3 is a plan view of the upper combining box as seen on plane 3—3 of Figure 2.

Figure 4 is a plan view of the lower combining box as seen on plane 4—4 of Figure 2.

Figure 5 is a vertical sectional view of the lift tank of Figure 1.

Referring now to Figure 1, the main stream of catalyst is withdrawn continuously from the bottom of the separator 10 through the conduit 11. The catalyst gravitates downwardly as a substantially compact column into the top of the reaction vessel 12, which may be maintained at an advanced pressure of about 5–30 p. s. i. (gauge) and a temperature of about 800–1100° F. An inert gas is introduced into the top of the vessel 12 or the bottom of the feed leg 11 to prevent the transfer of reactant gas through the pipe 11. The catalyst gravitates through the reactor as a substantially compact bed and is contacted therein with reactant hydrocarbons, suitably prepared for reaction, introduced through the conduit 13. The reactants may be in liquid, vapor or mixed liquid and vapor form, preheated, generally, to about 700–800° F., although higher or lower temperature may, in certain instances, be used, depending, to some extent, upon the type of charging stock. The hydrocarbons are converted, upon contacting the catalyst, to more desirable materials and the products are removed from the vessel through the conduit 14 to fractionation and processing apparatus, not shown. Inert gas is introduced into the bottom of the vessel through the conduit 24 to prevent the downward movement of reaction gases. The spent catalyst is withdrawn continuously from the bottom of the vessel and introduced into the depressurizer 15, usually, where the pressure is reduced practically to atmospheric. This is done, primarily, because it is simpler and more economical to regenerate or restore the material at substantially atmospheric pressure. In some cases, however, the contact material is regenerated at advanced pressure. This pressure may be greater than that in the reactor, and in such a case, it may be found more expedient to place the kiln over the reactor.

The depressurized catalyst is gravitated downwardly as a compact column through the reconditioner or kiln 16 wherein it is contacted with combustion supporting gas and the coke, deposited on the surface of the particles during reaction, is burned. The kiln is maintained at a temperature of about 1000–1300° F. Temperatures higher than that heat damage the catalyst, impairing its catalytic activity. Where only a heat carrying medium is required, however, inert refractory particles, such as corhart, or mullite, may be used and restored at temperatures well in excess of the above without damage. In order to control the temperature of the kiln, cooling coils may be utilized. Air is introduced into the kiln through the conduit 17 and flue gas is removed from the film through the conduit 18. A stream of flue gas is taken from the kiln through the conduit 22 to supply the elutriator, disclosed in more detail hereinafter.

The catalyst is withdrawn from the bottom of the kiln 16 through the conduit 23 to a depressurizer 24. The catalyst is then gravitated downwardly as a substantially compact column through the conduit 25 into the top of the lift tank 26. A suitable inert lift gas, such as flue gas, air or steam, which may be supplied through the conduits 27, 28, is introduced into the lift tank and passes upwardly through the lift pipe 28, effecting suspension and lifting of the catalyst. The catalyst settles onto a bed of solids in the separator 10 and the gas is discharged through the conduit 29. The lift tank is usually operated at an advanced pressure and the separator is generally operated at atmospheric pressure, or in some instances, slightly less.

At least one side stream of catalyst is withdrawn from the bottom of the vessel 10 through conduits 55. Preferably a multiplicity of withdrawal conduits is used attached at locations equally distributed about the bottom of the vessel. These downwardly directed conduits are combined into a single conduit 30. Conduits 31, 32 are attached to the lower end of conduit 30, to split the catalyst stream into two separate streams. The first stream is gravitated downwardly as a substantially compact column from the separator to an upper combining box, located at the bottom of the conduit 31. The second stream is in substantially compact form down to a release valve 35 in the conduit 32. The flow of this stream is controlled by the valve 35 so as to form a shower of descending particles below the valve. Of course, the two streams can be carried in separate conduits from the separator, if desired, instead of the arrangement shown.

An elutriator is attached to the bottom of the conduit 32. The particles pass downwardly through the vessel. Gas, introduced through the conduit 22, passes upwardly through the particles. The gas flow is controlled, by means of the valve 56, to effect suspension of the fine particles in the gas stream, without interfering with the downward movement of the granules. The fines-free contact material is removed from the vessel through the conduit 37 to the upper combining box. The fines pass out the top of the vessel entrained in the gas.

Referring now to the Figure 2, the conduit 31 terminates within the upper combining box 33. The conduit 37 also terminates in the top of the upper combining box. A withdrawal conduit 38 is attached to the bottom of the box. The withdrawal aperture of the conduit 38 in the bottom of the box 33 is located substantially directly below the discharge aperture of the conduit 37 carrying the second stream. This is the preferred form of the invention, however, in less preferred form the second stream can be discharged at any location above the bed in the combining zone. The dispersed particles, after contacting the surface of the bed, roll down the inclined surface to a location above the withdrawal aperture. The discharge aperture of the conduit 31 carrying the first stream is laterally displaced from the withdrawal aperture, so that an imaginary line connecting the closest point of the discharge aperture with that of the withdrawal aperture is located at or about the internal angle of catalyst flow. The angle of internal flow varies from about 65 to 80 degrees depending upon the nature of the catalyst. When catalyst is withdrawn from an outlet located beneath a bed of the material, the withdrawal occurs from a generally cone-shaped region located directly above the withdrawal aperture. The slope of the side element of the cone varies from 65–80 degrees broadly depending upon the catalyst. In most cases it has been found that preferably the angle with the horizontal of a line through the nearest points on adjacent edges of outlet 38 and inlet 31 should be about 70–75 degrees with the horizontal, as indicated on Figure 2. By locating at least most of the discharge aperture of conduit 31 outside this region, the catalyst introduced through the conduit 37 is preferentially withdrawn from the box to that introduced through the conduit 31. The level of the discharge aperture of the conduit 31 is located above the withdrawal aperture so that the catalyst introduced through the conduit 31 forms a bed which covers the withdrawal aperture. The catalyst forms a free surface at the angle of repose of the material. This ranges from about 25-45 degrees, broadly, and is usually about 30 degrees. When sufficient catalyst is introduced through the conduit 37 to maintain the surface level of the bed of catalyst in the combining box 33 up to the outlet of the conduit 31, the catalyst flow through the conduit 31 is restricted or stopped. When sufficient catalyst is not introduced through the conduit 37 to maintain the level constant, the bed surface pulls away from the outlet aperture of the conduit 31, allowing catalyst to tumble out of the conduit and roll down the surface of the bed at a rate which is fast enough to prevent the bed level from falling any substantial distance.

It is preferred that under all conditions at least some catalyst be withdrawn from the first stream to maintain a continuous catalyst movement. Otherwise, the particles tend to pack and bridge the conduit. Also, the particles in the leg when stationary cool to a low temperature. When the flow is resumed, the cool catalyst tends to upset the thermal conditions in the system. In order to insure continuous movement in the first stream, the first stream is located laterally displaced from the withdrawal stream so that an imaginary line connecting the nearest point of the withdrawal stream with the nearest point of the first stream forms an angle with the horizontal which is greater than the internal angle of catalyst flow. It is preferred that the angle be only slightly greater than the angle of internal flow, so that when the flow of the second stream is high, the flow of the first stream is reduced to a minimum necessary to overcome the defects of a static stream. For example, if the internal angle is about 70 degrees, 75 degrees would be satisfactory in most cases.

The conduit 38, depending from the upper combining box, conducts the withdrawal stream downwardly into a lower combining box 39. The catalyst is discharged onto a bed of catalyst in this box, similar to the discharge of the first stream onto the bed surface in the upper combining box. Since the fines are continuously removed, the catalyst inventory is depleted to the extent that, from time to time, fresh catalyst must be added. A level indicator is usually incorporated in the separator to determine the need for fresh catalyst. The fresh supply is added through the conduit 40 into a rising bucket-type elevator 41 and is discharged therefrom into the conduit 42, overflow box 43 and conduit 44 into the lower combining box 39. The particles are withdrawn from the box 39 through the conduit 45 as a substantially compact stream and introduced into the top of the lift tank 26. The gas pressure in the elutriator is usually slightly higher than atmospheric, say, for example, 0.5 p. s. i. (gauge), in order to provide suitable gas flow through the vessel. The upper combining box is maintained at substantially the same pressure. The fresh catalyst is introduced at atmospheric pressure. The column of catalyst between the two boxes is made long enough to provide a suitable seal between the vessels and prevent any substantial transfer of gas from one zone to another. The lift tank 26 is usually operated at advanced pressure, say, for example, 5 p. s. i. (gauge). Hence, the seal column in conduit 45 must be made long enough to prevent the escape of any substantial amount of the gas in the lift tank and also provide smooth feeding of the catalyst downwardly into the lift tank against the advanced pressure. The catalyst is discharged into the lift tank 26 from a location about the bed of catalyst therein. The flow of the catalyst through the conduit 45 is controlled by a valve 65 at the bottom of the conduit. A suitable valve control is shown on Figure 5. The seal column is introduced into the top section of the lift tank 26 and discharged into the bin 70. The bin 70 has an aperture 71 in the floor through which a stream of contact material can pass. The flow through the aperture is controlled by the adjustable valve 65. The valve plate has a multiplicity of orifices of varying size in its surface. The flow rate of the contact material is adjusted by bringing the desired orifice into alignment with the bin aperture. The bin 70 is constructed so that a large mass of the contact material is exposed to the atmosphere in the lift tank. If this were not done, the pressure drop across the orifice in the valve plate would be high and disrupt the flow of contact material therethrough. By equalizing the pressure on opposite sides of the orifice, this difficulty is overcome.

The catalyst flow rate from the upper combining box down to the lift tank is maintained, during normal operation, faster than the maximum possible flow rate of the second stream, passing through the conduit 37. This insures that the level of catalyst in the upper combining box will not rise above the top of the box except during unusual circumstances. For example, during the period when fresh catalyst is being added, the level may rise somewhat. This occurs infrequently, however, and is soon rectified when the normal circulation is resumed.

If the pressure in the separator 10 is substantially greater or less than atmospheric pressure, the length of the substantially compact column of catalyst in the side stream must be maintained at least long enough to provide an adequate seal between the settling zone and the combining zone or between the settling zone and the fines-removal zone. This prevents the exchange of gas between the zones.

In less preferred form, a valve is installed at the bottom of the conduit carrying the first stream of contact material. The valve is operated automatically by a controller connected to level control means in the combining box, so as to maintain a constant bed level in the box. The operation of the elutriator is not affected, therefore, by a change in the flow rate of the first stream, required to maintain constant level of the seal column between the combining box and the lift tank.

*Example I*

The apparatus of the invention was incorporated in a commercial 10,000–15,000 bbl. per stream day hydrocarbon cracking system of the continuous moving bed type. The catalyst was synthetic spherical beads of the silica-alumina-chromia type. The catalyst particle size was about ⅛ inch diameter, and the poured density about 45 pounds per cu. ft. The catalyst circulation rate of the system was 365 tons per hour, with a side stream of about 15 tons being withdrawn from the separator for use in elutriation. The dimensions of the combining box were:

| | |
|---|---|
| Height | 2 ft. 3 in. |
| Width | 1 ft. 11 in. |
| Thickness | 10 in. |
| Diameter of conduit carrying first stream of catalyst | 6 in. std. pipe |
| Diameter of conduit carrying second stream of catalyst | 4 in. std. pipe |
| Diameter of conduit carrying withdrawal stream from upper combining box to lower combining box | 8 in. std. pipe |
| Vertical distance downward from top of upper combining box to the end of the conduit carrying the first stream | 1 ft. |
| Distance from side wall of upper combining box to center line of conduit carrying first stream | 4½ in. |
| Distance from opposite side wall of combining box to center of withdrawal aperture in bottom of combining box | 6¾ in. |
| Distance from same side wall of combining box to center of discharge aperture at lower end of conduit carrying second stream located in the roof of the combining box | 4½ in. |
| Gas pressure in upper combining box | 0.2 p. s. i. (gauge) |
| Gas pressure in lower combining box | Atmospheric |
| Distance from bottom of lower combining box to top of lift tank | 35 ft. |
| Gas pressure in lift tank | 2.1 p. s. i. |
| Gas pressure in separator | 1.0 H₂O |
| Catalyst flow through elutriator | 2-13 T. P. H. |
| Catalyst flow through first stream, by-passing elutriator | 2-13 T. P. H. |

The examples and illustrations, given hereinabove, were supplied to illustrate the invention, and not to limit its scope. It is intended that the scope of this invention be considered broadly to cover all changes and modifications of the examples of the invention herein chosen for purposes of disclosures, which do not constitute departures from the spirit of the invention.

We claim:

1. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone and the contact material is withdrawn as a substantially compact column from the bottom of one of said zones to a feeding zone wherein a suspension of the contact material is effected in an upwardly flowing stream of lift gas and said contact material is lifted in said stream to a separation zone located above the other of said contacting zones from where the major portion of the contact material is gravitated downwardly from the bottom of said separation zone as a substantially compact column to the top of the other of said contacting zones, the improvement which comprises: gravitating a side stream of contact material downwardly from the separation zone as a substantially compact column, splitting the stream into two streams, gravitating the first stream downwardly as a compacted column into the top of a combining zone, releasing the second stream as a shower into a fines-removal zone, passing a gas through the fines-removal zone to carry off the fine particles entrained therein, gravitating the fines-free particles from the bottom of the fines-removal zone to the top of the first combining zone, withdrawing contact material from the bottom of said combining zone at a location substantially directly below the location of introduction of the second stream into said zone, but laterally displaced from the location of introduction of the first stream at an angle about equal to the internal angle of contact material flow, the discharge location of the first stream in said combining zone being located far enough above the withdrawal location in the bottom of the zone, so that the contact material introduced from the first stream forms a bed of material in the zone which covers the withdrawal location and forms a free surface at the angle of repose of the contact material, passing the contact material withdrawn from the bottom of said combining zone as a substantially compact column into the top of the feeding zone, the length of the column being sufficient to prevent the escape of any substantial proportion of the lift gas through the column, the rate of withdrawal of contact material from the combining zone being substantially greater than the maximum possible flow rate of the second stream, whereby the contact material passed through the fines-removal zone is selectively withdrawn from the combining zone and the surface level of the contact material in the combining zone is prevented from rising up into the fines-removal zone.

2. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone and the contact material is withdrawn as a substantially compact column from the bottom of one of said zones to a feeding zone wherein a suspension of the contact material is effected in an upwardly flowing stream of lift gas and said contact material is lifted in said stream to a separation zone located above the other of said contacting zones from where the major portion of the contact material is gravitated downwardly from the bottom of said separation zone as a substantially compact column to the top of the other of said contacting zones, the improvement which comprises: gravitating a side stream of contact material downwardly from the separation zone as a substantially compact column, splitting the stream into two streams, gravitating the first stream downwardly as a substantially compact column onto the top of a substantially compact bed of the material in a combining zone, releasing the second stream as a shower into a fines-removal zone, passing a gas through the fines-removal zone to carry off the fine particles entrained therein, gravitating the fines-free particles from the bottom of the fines-removal zone onto the top of the bed in the combining zone, withdrawing a stream of contact material from the bottom of the combining zone, the withdrawal stream being laterally displaced from the first stream, so that an imaginary line connecting the nearest point of contact of the withdrawal stream with that of the first stream is disposed at an angle slightly greater than the angle of internal flow, gravitating the contact material withdrawn from the bottom of said combining zone as a substantially compact column into the feeding zone, the length of the column being sufficient to prevent the escape of any substantial proportion of the lift gas through the column, the rate of withdrawal of contact material from the combining zone being greater than the maximum possible flow rate of the second stream, whereby the contact material passed through the fines-removal zone is selectively withdrawn from the combining zone and the surface level of the contact material in the combining zone is maintained substantially constant.

3. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone and the contact material is withdrawn as a substantially compact column from the bottom of one of said zones to a feeding zone wherein a suspension of the contact material is effected in an upwardly flowing stream of lift gas and said contact material is lifted in said stream to a separation zone located above the other of said contacting zones from where the major portion of the contact material is gravitated downwardly from the bottom of said separation zone as a substantially compact column to the top of the other of said contacting zones, the improvement which comprises: gravitating a side stream of contact material downwardly from the separation zone as a substantially compact column, splitting the stream into two streams, gravitating the first stream downwardly as a substantially compact column onto the top of a substantially compact bed of the material in a first combining zone, releasing the second stream as a shower into a fines-removal zone, passing a gas through the fines-removal zone to carry off the fine particles entrained therein, gravitating the fines-free particles from the bottom of the fines-removal zone onto the top of the bed in the first combining zone, withdrawing a stream of contact material from the bottom of the first combining zone from a location substantially directly below the location at which the second stream is introduced into the zone, the withdrawal stream being laterally displaced from the first stream, so that an imaginary line connecting the nearest point of contact of the withdrawal stream with that of the first stream is disposed at an angle slightly greater than the angle of internal flow of the contact material, gravitating the contact material withdrawn from the bottom of the first combining zone downwardly as a combined stream in substantially compact column form and discharging the combined stream onto the surface of a bed of the material in a second combining zone, the length of the combined stream between the first and second combining zones being sufficient to prevent the transfer of any substantial amount of gas from one zone to the other, intermittently introducing fresh contact material onto the top of the bed of contact material in said second combining zone, withdrawing a stream of contact material from the bottom of the second combining zone from a location substantially directly below the location at which the fresh contact material is introduced into the zone, the withdrawal stream being laterally displaced from the first stream, so that an imaginary line connecting the nearest point of contact of the withdrawal stream with that of the combining stream is disposed at an angle slightly greater than the angle of internal flow of the contact material, gravitating the contact material withdrawn from the bottom of the second combining zone downwardly as an elongated feed stream in substantially compact column form and discharging the feed stream into the feeding zone, the length of the feed stream being sufficient to provide smooth feeding of the contact material into the feeding zone and prevent the escape of any substantial amount of the lift gas from the feeding zone to the second combining zone.

4. In a moving bed conversion system in which conduit means connects the bottom of one of the contacting vessels with a lift tank located therebelow, a lift pipe connects the lift tank with a separator located above the other contacting vessel, and conduit means connects the bottom of the separator with the top of the second contacting vessel, the improvement which comprises: conduit means for withdrawing granular contact material from the bottom of the separator, a first downwardly directed conduit attached to said means, a combining box attached to the bottom of the first conduit, a second downwardly directed conduit attached to said means, an elutriator attached to said second conduit, valve means in said second conduit, a third conduit attached to the bottom of said elutriator connecting with the top of said combining box, a withdrawal conduit attached to the bottom of said combining box and the top of said lift tank, the length of the conduit being sufficient to provide a seal column of substantially compact contact material adequate for preventing the escape of any substantial amount of lift gas from the lift tank through the conduit, the discharge aperture at the bottom of the second conduit being located substantially directly above the withdrawal aperture at the top of the withdrawal conduit, and the discharge aperture of the first conduit being located laterally displaced from said withdrawal aperture, so that an imaginary line connecting the nearest point of the withdrawal aperture with that of the discharge aperture of the first conduit forms an angle of about 75 degrees with the horizontal.

5. In a moving bed conversion system wherein a granular contact material is passed cyclically through two contacting vessels, one being a reaction vessel and the other a reconditioning vessel, and contact material is withdrawn continuously from the bottom of one of the vessels through connecting means to a lift tank located therebelow, suspended and lifted in a lift gas through an upwardly directed lift passageway which connects the lift tank with a separator located above the other contacting vessel, separated from the lift gas in the separator, and gravitated as a substantially compact column from the lower portion of the separator through a conduit to the top of the other contact vessel, the improvement which comprises, in combination: at least one conduit attached to the bottom of said separator, adapted to withdraw gravitating contact material in substantially compact column form, means for splitting the withdrawn contact material into two streams, a first downwardly directed conduit attached to said means, a combining box attached to the bottom of said conduit, a second downwardly directed conduit attached to said means, an elutriator connected to the bottom of said second conduit, valve means in said second conduit, adapted to release granular material into said elutriator as a shower, means for passing a gas through said elutriator to remove fine particles from the granular material, a third conduit connecting the bottom of the elutriator and the combining box, a discharge conduit connecting the bottom of the combining box and the lift tank, the withdrawal aperture in said box being located substantially directly below the aperture of the third conduit but laterally displaced from the aperture of the first conduit, so as to preferentially withdraw from said box granular material supplied by the third conduit, the length of the withdrawal conduit being sufficient to provide a substantially compacted seal leg of contact material, whereby the escape of lift gas from the lift tank through this conduit is prevented.

6. In a moving bed conversion system in which conduit means connects the bottom of one of the contacting vessels with a lift tank located therebelow, a lift pipe connects the lift tank with a separator located above the other contacting vessel, and conduit means connects the bottom of the separator with the top of the second contacting vessel, the improvement which comprises: conduit means for withdrawing granular contact material from the bottom of the separator, a first downwardly directed conduit attached to said means, a combining box attached to the bottom of the first conduit, a second downwardly directed conduit attached to said means, an elutriator attached to said second conduit, valve means in said second conduit, a third conduit attached to the bottom of said elutriator connecting with the top of said combining box, a withdrawal conduit attached to the bottom of said combining box and the top of said lift tank, the length of the conduit being sufficient to provide a seal column of substantially compact contact material adequate for preventing the escape of any substantial amount of lift gas from the lift tank through the conduit, the discharge aperture at the bottom of the third conduit being located substantially directly above the withdrawal aperture at the top of the withdrawal conduit, and the discharge aperture of the first conduit being located laterally displaced from said withdrawal aperture, so that an imaginary line connecting the nearest point of the withdrawal aperture with that of the discharge aperture of the first conduit forms an angle of about 65-80 degrees with the horizontal.

7. In a moving bed conversion system in which a granular contact material is passed cyclically through two contacting vessels, and in which it is withdrawn from the bottom of one of the vessels to a lift tank, lifted pneumatically through a lift pipe to a separator and gravitated from the bottom of the separator downwardly to the top of the other contact vessel, the improved combination which comprises: a multiplicity of withdrawal conduits depending from the bottom of the separator, a single conduit attached to the bottom of said multiplicity of conduits, so as to combine the separate streams into a single combined stream, a first conduit attached to said single conduit, a first combining box attached to the bottom of said first conduit, a second conduit attached to said single conduit, an elutriator attached to the bottom of said second conduit, gas inlet and outlet means in said elutriator, a valve in said second conduit, a third conduit depending from the bottom of said elutriator attached to the top of said first combining box, a second combining box located below the first box, a connecting conduit between the bottom of the first box and the top of the second, the length of the connecting column being sufficient to provide a seal column of contact material adequate to prevent the transfer of any substantial amount of gas through the conduit, the discharge aperture of the third conduit being located substantially directly above the withdrawal aperture of the connecting conduit in the bottom of the first box, and the discharge aperture of the first conduit being located laterally displaced therefrom, so that an imaginary line connecting the closest point of the discharge aperture of the first conduit with that of the withdrawal aperture of the connecting conduit is located at an angle of about 75 degrees, and in addition, the discharge aperture of the first conduit is located at a level sufficiently above the withdrawal aperture, so that an imaginary line drawn from the closest point of the discharge aperture to the withdrawal aperture at an angle of about 30 degrees with the horizontal passes over the withdrawal aperture, a fresh contact material conduit attached to the top of the second proportioning box adjacent the connecting conduit, a seal conduit connecting the bottom of the second box with the top of the lift tank, being long enough to provide a substantially compact column of contact material adequate to prevent the transfer of any substantial amount of gas from the lift tank through the conduit, the discharge aperture of the fresh contact material conduit being located substantially directly above the aperture of the seal column in the bottom of the second combining box, the discharge aperture of the connecting conduit being laterally displaced therefrom, so that an imaginary line connecting the nearest point of the discharge aperture with that of the withdrawal aperture is located at an angle of about 75 degrees with the horizontal, and in addition, the discharge aperture of the connecting conduit is located at a level sufficiently above the withdrawal aperture, so that an imaginary line drawn from the closest point of the discharge aperture to the withdrawal aperture at an angle of about 30 degrees with the horizontal passes over the withdrawal aperture.

8. In a moving bed conversion system in which a granular contact material is passed cyclically through two contacting vessels, and in which it is withdrawn from the bottom of one of the vessels to a lift tank, lifted pneumatically through a lift pipe to a separator and gravitated from the bottom of the separator downwardly to the top of the other contacting vessel, the improved combination which comprises: a multiplicity of withdrawal conduits depending from the bottom of the separator, a single conduit attached to the bottom of said multiplicity of conduits, so as to combine the separate streams into a single combined stream, a first conduit attached to said single conduit, a first proportioning box attached to the bottom of said first conduit, a second conduit attached to said single conduit, an elutriator attached to the bottom of said second conduit, gas inlet and outlet means in said elutriator, a valve in said second conduit, a third conduit depending from the bottom of said elutriator attached to the top of said first proportioning box, a second proportioning box located below the first box, a connecting conduit between the bottom of the first box and the top of the second, the length of the connecting column being sufficient to provide a seal column of contact material adequate to prevent the transfer of any substantial amount of gas through the conduit, the discharge aperture of the third conduit being located substantially directly above the withdrawal aperture of the connecting conduit in the bottom of the first box, and the discharge aperture of the first conduit being located laterally displaced therefrom, so that an imaginary line connecting the closest point of the discharge aperture of the first conduit with that of the withdrawal aperture of the connecting conduit is located at an angle of about 75-degrees, and in addition, the discharge aperture of the first conduit is located at a level sufficiently above the withdrawal aperture, so that an imaginary line drawn from the closest point of the discharge aperture to the withdrawal aperture at an angle of about 30-degrees with the horizontal passes over the withdrawal aperture, a fresh contact material conduit attached to the top of the second proportioning box adjacent the connecting conduit, a seal conduit connecting the bottom of the second box with the top of the lift tank, being long enough to provide a substantially compact column of contact material adequate to prevent the transfer of any substantial amount of gas from the lift tank through the conduit, the discharge aperture of the fresh contact material conduit being located substantially directly above the aperture of the seal column in the bottom of the second proportioning box, the discharge aperture of the connecting conduit being laterally displaced therefrom so that an imaginary line connecting the nearest point of the discharge aperture with that of the withdrawal aperture is located at an angle of about 65-80 degrees with the horizontal, and in addition, the discharge aperture of the connecting conduit is located at a level sufficiently above the withdrawal aperture, so that an imaginary line drawn from the closest point of the discharge aperture to the withdrawal aperture at an angle of about 30-degrees with the horizontal passes over the withdrawal aperture.

9. Apparatus for transferring a granular contact material from a low pressure vessel to a high pressure vessel comprising in combination: a combining box, a downwardly directed conduit with its lower end projected into the top of the box, a withdrawal conduit attached to the bottom of the box, said withdrawal conduit laterally displaced from said first conduit, a high pressure vessel located at the bottom of said withdrawal conduit, the withdrawal conduit being at least long enough to feed contact material into the vessel against the advanced pressure therein, a low pressure vessel located above said combining box, and a conduit connecting the bottom of said low pressure vessel with the top of said combining box, so as to permit contact material to be charged from said conduit onto the surface of a bed of catalyst in the combining zone.

10. Apparatus for transferring a granular contact material from a low pressure vessel to a high pressure vessel comprising in combination: a combining box, a downwardly directed conduit with its lower end projected into the top of said box, adapted to feed a continuous column of contact material into the box and maintain therein the surface of a bed of the material, a withdrawal conduit attached to the bottom of the box, said withdrawal conduit laterally displaced from said first conduit, a high pressure vessel located at the bottom of said withdrawal conduit, the withdrawal conduit being at least long enough to feed contact material from the combining box into the high pressure vessel against the advanced pressure therein, valve means located at the lower end of said withdrawal conduit, adapted to control the flow rate of the contact material in the conduit, a low pressure vessel located above said combining box, a conduit connecting the bottom of said low pressure vessel with the top of the said combining box, so as to direct contact material downwardly from said low pressure onto the surface of the bed of contact material in said combining vessel directly above the withdrawal conduit.

11. In a system wherein a granular contact material is passed cyclically through two contacting vessels, one being a reaction vessel and having spaced apart reactant inlet and outlet means, a contact material inlet at its upper end and a contact material outlet at its lower end, and the other being a regeneration vessel having spaced apart gas inlet and outlet means and a contact material inlet at its upper end and a contact material outlet at its lower end, conduit means connected to the outlet of one of the vessels for withdrawing a compacted column from the bottom of the vessel to a lift tank wherein suspension of the material is effected in an upwardly flowing stream of gas and the material conveyed upwardly through a lift pipe to a separator and then gravitated downwardly through a conduit to the inlet on top of the other vessel, the improvement which comprises: a first conduit depending from said separator, a combining box attached to the bottom of said conduit, located at a level substantially above said lift tank, a second conduit attached to the bottom of said separator, an elutriator attached to the bottom of said second conduit, said elutriator located at a level above said combining box, a valve in said second conduit, a third conduit connected between the bottom of said elutriator and top of said combining box, a seal conduit connecting between the bottom of said combining box and the top of said lift tank, the length being sufficient to provide a substantially compact column of granular material adequate to prevent the escape of any substantial quantity of lift gas through the conduit, the discharge aperture of the third conduit being located substantially directly above the withdrawal aperture of the seal conduit, the discharge aperture of the first conduit being located laterally displaced therefrom, so that an imaginary line connecting the nearest point on the discharge aperture with that of the withdrawal aperture forms an angle with the horizontal of about 75 degrees, and, in addition, an imaginary line drawn from the closest point of the discharge aperture to the withdrawal aperture at an angle of about 30 degrees passes over the withdrawal aperture, the cross-section of the seal conduit being substantially larger than the cross-section of the third conduit.

12. The method of transferring a particle-form contact material from a low pressure zone to a high pressure zone which comprises: gravitating contact material downwardly from said low pressure zone in substantially compact columnar form, introducing the contact material into a combining zone at a first location, so as to form a bed of solid material in said zone, introducing a second stream of contact material into said combining zone at a second location adjacent said first location, so as to drop onto the surface of the bed of contact material in said combining zone, withdrawing a substantially compact column of contact material downwardly from the bottom of said combining zone at a third location, substantially directly below said second location but laterally displaced from said first location, so as to preferentially withdraw from the combining zone the contact material supplied by said second stream of contact material, and discharging the compact column of contact material withdrawn from said combining zone into the high pressure zone, the length of said column being sufficient to provide a substantially compacted seal leg of contact material, whereby the escape of gas from the high pressure zone is substantially prevented.

13. The method of introducing a particle-form contact material into a high pressure zone which comprises: gravitating a substantially compact column of contact material downwardly into a combining zone at a first location, so as to form a bed of solid material in said zone, introducing a second stream of contact material into said combining zone at a second location adjacent said first location, so as to drop onto the surface of the bed of contact material in said combining zone, withdrawing a substantially compact column of contact material downwardly from the bottom of said combining zone at a third location, substantially directly below said second location but laterally displaced from said first location, so as to preferentially withdraw from the combining zone the contact material supplied by said second stream of contact material, and discharging the compact column of contact material withdrawn from said combining zone into the high pressure zone, the length of said column being sufficient to provide a substantially compact seal leg of contact material, whereby the escape of gas from the high pressure zone is substantially prevented.

14. The method of introducing a particle-form contact material into a high pressure zone which comprises: gravitating a substantially compact column of contact material downwardly into a combining zone at a first location, so as to form a bed of solid material in said zone, introducing a second stream of contact material into said combining zone at a second location adjacent said first location, so as to drop onto the surface of the established bed of contact material in said combining zone, withdrawing a substantially compact column of contact material downwardly from the bottom of said combining zone at a third location, substantially directly below said second location but laterally displaced from said first location, so that an imaginary line connecting the nearest point of the column of contact material supplied to the combining zone with the nearest point of the column of contact material withdrawn from the combining zone forms an angle of about 65–80 degrees with the horizontal, and discharging the compact column of contact material withdrawn from said combining zone into the high pressure zone, the length of said column being sufficient to provide a substantially compact seal leg of contact material, whereby the escape of gas from the high pressure zone is substantially prevented.

15. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone and the contact material is withdrawn as a substantially compact column from the bottom of one of the zones to a feeding zone wherein a suspension of the contact material is effected in an upwardly flowing stream of lift gas and said contact material is lifted in said stream to a separation zone located above the other of said contacting zones from where the major portion of the contact material is gravitated downwardly from the bottom of said separation zone as a substantially compact column to the top of the other of said contacting zones, the improvement which comprises: gravitating a substantially compact column of contact material downwardly into a combining zone at a first location, so as to form a bed of solid material in said zone, introducing a second stream of contact material into said combining zone at a second location adjacent said first location, so as to drop onto the surface of the established bed of contact material in said combining zone, withdrawing a substantially compact column of contact material downwardly from the bottom of said combining zone at a third location, substantially directly below said second location but laterally displaced from said first location, so that an imaginary line connecting the nearest point of the column of contact material supplied to the combining zone with the nearest point of the column of contact material withdrawn from the combining zone forms an angle of about 65–80 degrees with the horizontal, and discharging the compact column of contact material withdrawn from said combining zone into the high pressure zone, the length of said column being sufficient to provide a substantially compact seal leg of contact material, whereby the escape of gas from the high pressure zone is substantially prevented.

ERIC V. BERGSTROM.
EDWARD R. SORF.

References Cited in the file of this patent
UNITED STATES PATENTS

| Number | Name | Date |
|---|---|---|
| 2,494,794 | Bonnell | Jan. 17, 1950 |
| 2,546,625 | Bergstrom | Mar. 27, 1951 |
| 2,561,409 | Ardern | July 24, 1951 |